Patented Feb. 20, 1951

2,542,723

UNITED STATES PATENT OFFICE 2,542,723

NUTRIENT COMPOSITIONS

Jakob A. Stekol, Toledo, Ohio, assignor to International Minerals and Chemical Corporation, a corporation of New York No Drawing. Application September 16, 1947, Serial No. 774,437

11 Claims. (Cl. 99—14)

This invention relates to nutrient compositions which contain chemical compositions biologically equivalent to cystine and methionine. More particularly it relates to nutrient compositions and animal food products which contain inorganic salts of diacetyl-L-cystine.

The two main sulphur-containing amino acids which are present in animal and vegetable proteins are cystine and methionine. In order that animal organisms may maintain satisfactory growth and adequate dietary levels, it is essential that the protein content of their diets contain between about 0.5 and about 2.0% of such sulphur-containing amino acids. The protein content of numerous processed and/or natural foods has been found to be deficient in such amino acids, sometimes to a harmful extent. For example, casein, which is the main protein constituent of milk and milk products, while containing about 3% of methionine, contains only about 0.4% of cystine. Other nutritive proteins which are deficient in at least one of the aforementioned sulphur-containing amino acids are zein, gelatin and hemoglobin. In order to bring the sulphur-containing amino acid content of such proteins up to an adequate and beneficial dietary level, it has been proposed to supplement such proteins with cystine and/or methionine, which may be prepared synthetically or obtained by the hydrolysis of proteins which are highly enriched in these substances. While such supplemented proteins are beneficial to animal organisms insofar as the sulphur-containing amino acid content is concerned, they suffer from various disadvantages caused by the inherent characteristics of the cystine and/or methionine which has been added. For example, should these amino acids as such be added to liquid food compositions such as milk, a heterogeneous insoluble mixture of solid amino acids in milk would result. This, of course, while being nutritionally advantageous, is unpleasing and unattractive to milk consumers. In addition, if mineral acid salts of these amino acids are added to milk, similar results are attained even though these salts are soluble, in the amounts to be used, in milk. It is believed that the buffering action of milk neutralizes the acid addition salts so that, in effect, the insoluble free amino acids are actually present in the milk. It has not been feasible to incorporate neutral salts of cystine into food products because this amino acid undergoes decomposition in the presence of alkaline media and liberates hydrogen sulfide. This result is, of course, highly undesirable for the intended purpose. Furthermore the solubility characteristics of these amino acids are such that it is exceedingly difficult to incorporate sufficient beneficial amounts of the same into liquid foods without causing either crystallization or separation of the amino acids from the liquid. Should such amino acids be successfully incorporated into the solid food compositions, the aforementioned disadvantages again present themselves.

In the case of animal organisms which are not capable of assimilating an oral intake of proteins, it has been the prior practice to prepare hydrolysates of either vegetable or animal proteins, and to administer an approximately neutral solution of such hydrolysates by oral, intravenous or other methods. Frequently the hydrolytic procedures employed cause a reduction in the sulphur-containing amino acid content of the resultant hydrolysate due to the decomposition of such amino acids under the conditions obtaining. In order to supplement such hydrolysates with sulphur-containing amino acids, small amounts of either methionine and/or cystine have been added thereto. However, the low solubility of cystine and methionine in the hydrolysates is again an important factor, and the disadvantages of directly adding amino acids render the oral intake of such solutions rather objectionable.

It is an object of the invention to produce nutrient compositions which are supplemented by chemical compositions which are nutritionally substantially equivalent to cystine or methionine.

It is a further object of the invention to provide nutrient compositions which, though normally deficient in sulphur-containing amino acids, are supplemented by chemical compositions nutritionally substantially equivalent to cystine or methionine.

It is a further object of the invention to provide animal food compositions whose protein content is normally deficient in sulphur-containing amino acids and which are supplemented by novel and useful chemical compositions which are nutritionally substantially equivalent to cystine or methionine but which do not possess the disadvantages attendant the direct addition of these amino acids.

It is a further object of the invention to provide food compositions which are nutritionally substantially enriched with the equivalent of cystine and methionine and at the same time are substantially neutral and/or palatable.

It is a further object of the invention to provide chemical compositions which are appreciably soluble in water or liquid food compositions such as milk as contrasted with the poor solubility of cystine or methionine in such liquids.

It is a further object of the invention to provide salts whose anion is nutritionally substantially equivalent to cystine or methionine and whose cations consist of metals which are useful to the bone structure, metabolism, or growth of animal organisms.

The above objects as well as others which will become apparent upon a thorough understanding of the invention which is hereinafter completely described are accomplished by preparing nutrient compositions containing a minor or a small amount of at least one inorganic salt of N,N-diacetyl-L-cystine. By the term "nutrient composition" is meant any animal food composition which may or may not contain animal and/or vegetable proteins, or hydrolysates of proteinaceous materials which can be either orally or intravenously administered or consumed. The term "minor amount" as used herein means that the nutrient composition contains less than 50% of at least one inorganic salt of N,N-diacetyl-L-cystine, and the term "small amount" means that the nutrient composition contains 25% or less of at least one inorganic salt of N,N-diacetyl-L-cystine.

The term "diacetyl-L-cystine" as used in the description and in the appended claims means N,N-diacetyl-L-cystine, and is employed for purposes of convenience.

The inorganic salts of diacetyl-L-cystine are, in general, prepared by reacting diacetyl-L-cystine with a metal hydroxide, such as the hydroxides of sodium, potassium and calcium. While the invention preferably contemplates the use of the sodium, potassium and calcium salts of diacetyl-L-cystine as substitutes for methionine or cystine, the invention also contemplates the use of the diacetyl-L-cystine salt of any metal which is beneficial to the bone structure or growth of animal organisms. For example: the magnesium, copper, iron, manganese, cobalt and zinc salts of diacetyl-L-cystine can be incorporated into either solid or liquid animal food compositions or protein hydrolystates where a diagnosis indicates that the animal organism is deficient in such metals. By employing such salts, either as such or as supplements in food compositions which are deficient in cystine or methionine, a dual beneficial result is achieved in that the diacetyl-L-cystine anion has now been found to be biologically equivalent to cystine or methionine as a growth promoter and the cation selected from the group of metals aforementioned may be beneficial to the mineral content of the animal organisms.

More particularly, the present invention contemplates the production of various inorganic salts of diacetyl-L-cystine by first preparing diacetyl-L-cystine substantially according to the procedure described by Du Vigneaud and Meyer, J. Biol. Chem., vol. 94, 245 (1931). Diacetyl-L-cystine is reacted with either a carbonate, oxide, or hydroxide of a metal listed in the above paragraph; and the resultant salt is incorporated into the particular liquid or solid food composition desired, or into protein hydrolysates which are either deficient in cystine or methionine or where supplemental amounts of sulphur-containing amino acids are desired. It has been found that these inorganic salts of diacetyl-L-cystine are biologically and nutritionally substantially the equivalent of cystine or methionine as growth promoting and life sustaining chemicals.

The major proteinaceous component of cows' milk and milk products is casein. It has been found that casein is generally deficient in cystine, containing only approximately 0.4% of this amino acid. A beneficial amount of cystine in any proteinaceous material is about 1 to 2%, and it is therefore desirable to supplement milk or milk products with either cystine or a chemical composition which is biologically and/or nutritionally substantially equivalent to cystine. For this purpose it has been found that the calcium, sodium, or potassium salts of diacetyl-L-cystine, or combinations of these salts, are particularly desirable in that such salts are quite soluble in milk, and, having practically no taste themselves, do not affect the palatability of milk foods. Furthermore, the aforementioned salts are substantially neutral in character and therefore do not affect the buffer components of milk or cause its de-emulsification. Cystine, on the other hand, when added to milk imparts undesirable characteristics thereto, and, upon prolonged standing, the milk suspension usually breaks. Furthermore, the aforementioned salts enhance the mineral content of milk foods which property is, in many cases, highly beneficial to animal organisms. An appropriate amount of any one or a mixture of such salts may be added to milk foods in order to afford a cystine (equivalent) content of milk protein of between about 0.01 and about 25%, preferably between about 1.0 and about 2.0%. Should the particular animal subject be generally deficient in cystine, larger amounts of these salts, up to 25.0 per cent by weight of the casein, may be added to milk foods.

As hereinbefore mentioned, protein hydrolysates, which are beneficial to animal organisms which cannot readily assimilate proteins as such, are frequently deficient in cystine due to the decomposition of this compound during the various hydrolytic procedures usually employed. It is therefore desirable to supplement such protein hydrolysates with either cystine or chemical compositions which are nutritionally equivalent thereto. Cystine itself is highly insoluble in such hydrolysates, and it is therefore preferable to incorporate therein at least one inorganic salt of diacetyl-L-cystine from the group previously described. It has been found that these salts are biologically and/or nutritionally substantially equivalent to cystine in such hydrolysates.

Gelatin usually contains about 0.17% of cystine and practically no methionine. Since gelatin is a common form of protein which is administered to animals, the addition thereto of supplemental amounts of cystine, methionine or chemical compositions which are biologically and nutritionally substantially equivalent to such amino acids is highly desirable. It has been found that the addition of between about 1 and about 2% of an inorganic salt of diacetyl-L-cystine is highly advantageous but any amount of such salt between about 0.01 and about 25.0% by weight may be incorporated into dried gelatin or gelatin solutions. Here again, it is preferable to use a salt selected from the group consisting of sodium, potassium and calcium, although other metal salts such as those previously described may be used in appropriate amounts.

In general, any nutrient composition which is deficient in cystine or methionine, or where supplemental amounts of such amino acids are desired due to a sulphur-containing amino acid deficiency in any particular animal, may be supplemented by a salt of diacetyl-L-cystine from the group previously described in an amount between about 0.01 and about 25.0% by weight, usually based on the protein content of said nutrient composition. Therefore either liquid or solid food compositions or protein hydrolysates may be supplemented by inorganic salts of diacetyl-L-cystine in the aforestated amounts.

In order to afford a more complete description of the invention, but with no intention of being limited thereby, the following example is recited:

Example

Diacetyl-L-cystine is prepared substantially according to the procedure outlined in J. Biol. Chem., vol. 94, 245 (1931). About 100 g. of L-cystine is dissolved in about 450 ml. of 1.85 normal NaOH, while maintaining the alkaline solution at about 5° C. About 275 ml. of 1.85 normal NaOH is added to the solution followed by about 27.5 ml. of acetic anhydride while stirring the mixture continuously. Eight 275 ml. portions of 1.85 normal NaOH and eight 27.5 ml. portions of acetic anhydride are subsequently added alternately while maintaining the reaction mixture at about 5° C. Following the addition of the reagents, the mixture is allowed to stand at room temperature for about 30 minutes, after which about 708 ml. of 6.9 normal hydrochloric acid is added. The solution is then filtered and evaporated to dryness in vacuo on a water bath at a temperature of about 60° to 70° C. The substantially dry residue is extracted with wet acetone (a ratio of about 1 volume of water to about 4 volumes of acetone), ten 250 ml. portions of this solvent being required to extract the diacetyl-L-cystine product. The acetone extract is then evaporated to dryness in vacuo on a water bath at a temperature of about 60° to 70° C. and the substantially dry residue extracted with 6 portions of absolute ethyl alcohol (3 portions of 100 ml. each and 2 portions of 50 ml.). The combined alcoholic extracts are evaporated in vacuo to dryness on a water bath at a temperature of about 60° to 70° C. The substantially dry residue is dissolved in about 500 ml. of water and neutralized to a pH of about 7.0 with 1.85 normal NaOH. The neutralized solution is treated with activated carbon, filtered, and the colorless filtrate evaporated to dryness in vacuo at a temperature of about 50° to 60° C. Any residual water which remains in the product can be removed by extracting the same with absolute ethyl alcohol and distilling said alcohol in vacuo at the previously mentioned temperatures. The yield of sodium diacetyl-L-cystine is about 130 to 140 g., or about 85 to 95% of the theoretical amount based on the initial L-cystine reactant. The sodium salt is a colorless crystalline material which is somewhat hygroscopic; the melting point, with decomposition, being at about 204 to 208° C. (uncorrected); specific rotation $(\alpha)_D 23° = -119$ for a 10% aqueous solution.

In order to illustrate the utility of the sodium salt of diacetyl-L-cystine, the following animal diets were prepared and the subjects selected were twelve rats weighing about 50 to 60 g. each. The animals were divided into four groups, and fed a basic diet which contained 10% casein and suitable amounts of corn starch, powdered yeast, lard, cane sugar and salts. This is a low casein diet, and deficient in L-cystine. One group of the rats received about 1.0% of sodium diacetyl-L-cystine as a supplement to the basic diet, a second group received about 1.0% of L-cystine as a supplement, the 3rd group received about 1.0% of dl-methionine as a supplement and the 4th group was fed the basic diet alone. The first three groups of rats gained on an average of 2.7 to 3.2 g. per day, while the control group gained on an average of 1.5 g. per day over a three-week period. When the supplement of sodium diacetyl-L-cystine was withdrawn from the diet of group 1, and this group was fed the basic diet alone, all of the rats lost weight for a period of 7 to 8 days, and then commenced to gain weight at a rate of about 1.2 to 1.4 g. per day.

The above data demonstrate that the sodium salt of diacetyl-L-cystine is of great utility as a growth promoter and is biologically equivalent to L-cystine or dl-methionine under controlled and specified conditions.

The above example is considered to be merely one embodiment of the instant invention and the invention is obviously not limited to the particular salt of diacetyl-L-cystine illustrated or to the particular animal food composition described above, but is limited only by the scope of the appended claims. The preparation of inorganic salts of diacetyl-L-cystine as well as the preparation of nutrient compositions containing such salts may be carried out by obvious extensions and modifications of the procedures herein set forth.

As used in the description and accompanying claims, the term "proteinaceous food composition" is intended to include those foods which are proteins, or which contain protein, or which are or which contain protein degradation products such as the amino acids; for example, protein hydrolysates or fractions thereof.

What is desired to be secured by Letters Patent is:

1. A composition of matter comprising a major amount of a homogenous, proteinaceous food composition and an added minor amount of at least one inorganic salt of diacetyl-L-cystine.

2. A composition of matter comprising a major amount of a homogenous, proteinaceous food composition and an added small amount of at least one inorganic salt of diacetyl-L-cystine.

3. A composition of matter comprising a major amount of milk and an added small amount of at least one inorganic salt of diacetyl-L-cystine.

4. A composition of matter comprising a major amount of a protein hydrolysate and an added small amount of at least one inorganic salt of diacetyl-L-cystine.

5. A composition of matter comprising a major amount of gelatin and an added small amount of at least one inorganic salt of diacetyl-L-cystine.

6. A composition of matter comprising a major amount of milk and an added small amount of at least one compound selected from the group consisting of the sodium, potassium, and calcium salts of diacetyl-L-cystine.

7. A composition of matter comprising a major amount of a protein hydrolysate and an added small amount of at least one compound selected from the group consisting of the sodium, potassium, and calcium salts of diacetyl-L-cystine.

8. A composition of matter comprising a major amount of gelatin and an added small amount of at least one compound selected from the group consisting of the sodium, potassium, and calcium salts of diacetyl-L-cystine.

9. A composition of matter comprising a major amount of milk and an added small amount of the sodium salt of diacetyl-L-cystine.

10. A composition of matter comprising a major amount of a protein hydrolysate and an added small amount of the sodium salt of diacetyl-L-cystine.

11. A composition of matter comprising a major amount of gelatin and an added small amount of the sodium salt of diacetyl-L-cystine.

JAKOB A. STEKOL.

REFERENCES CITED

The following references are of record in the file of this patent:

UNITED STATES PATENTS

| Number | Name | Date |
|---|---|---|
| 2,344,229 | Block et al. | Mar. 14, 1944 |
| 2,374,407 | Block et al. | Apr. 24, 1945 |

OTHER REFERENCES

Science, vol. 98, No. 2543, pages 286-288, September 24, 1943, by Albanese et al.

Jr. Am. Dietetic Assoc., Nov. 1943, pages 762-767, by Melnick.

Jr. Biol. Chem., vol. 94, page 245 (1931), by Hollander et al.